United States Patent

Goto et al.

Patent Number: 6,140,727
Date of Patent: Oct. 31, 2000

[54] PULSE SIGNAL GENERATOR

[75] Inventors: Akihiro Goto; Shoji Oyama; Tomoaki Ito, all of Tokyo, Japan

[73] Assignee: Hirose Electric Co., Ltd, Tokyo, Japan

[21] Appl. No.: 09/186,100

[22] Filed: Nov. 5, 1998

[30] Foreign Application Priority Data

Nov. 14, 1997 [JP] Japan ..................... 9-313453

[51] Int. Cl.⁷ .............. H02K 21/38; G01B 7/14
[52] U.S. Cl. .............. 310/155; 310/68 B; 324/174; 324/207.15; 324/207.25; 324/207.26
[58] Field of Search ................ 310/68 B, 155; 365/133; 324/174, 207.11, 207.13, 207.15, 207.2, 207.21, 207.25, 207.26

[56] References Cited

U.S. PATENT DOCUMENTS

| 4,236,093 | 11/1980 | Birnbaum ................ 310/155 |
| 4,263,525 | 4/1981 | Lathlaen ................. 310/155 |
| 4,316,110 | 2/1982 | Lathlaen . | |

FOREIGN PATENT DOCUMENTS

| 0288759 | 11/1988 | European Pat. Off. . |
| 0448114 | 9/1991 | European Pat. Off. . |
| 2073428 | 10/1981 | United Kingdom . |
| 2125970 | 3/1984 | United Kingdom . |

*Primary Examiner*—Michael L. Gellner
*Assistant Examiner*—Ray Barrera
*Attorney, Agent, or Firm*—Kanesaka & Takeuchi

[57] ABSTRACT

A pulse signal generator comprises a magnetic element (1) capable of causing a large Barkhausen jump; a detector (2) provided relative to the magnetic element; a magnetic field generator (3) provided in vicinity of the magnetic element for applying a biasing magnetic field to the magnetic element for making a predetermined magnetization; and a magnetic circuit forming unit (4) provided in vicinity of the magnetic element for applying a main magnetic field to the magnetic element for causing a large Barkhausen jump in the magnetic element. The magnetic field generator is provided with magnetic field concentration means (32A) for concentrating the biasing magnetic field upon the magnetic element and the magnetic field adjusting means (74) for adjusting an intensity of the biasing magnetic field upon the magnetic element.

13 Claims, 3 Drawing Sheets

PULSE SIGNAL GENERATOR

BACKGROUND OF THE INVENTION

1. Filed of the Invention

The present invention relates to apparatus for generating pulse signals.

2. Description of the Related Art

It is necessary to provide a pulse signal in response to the position or speed of a moving object in the field of automatic control or electric or electronic equipment. An electromagnetic pickup is an example of such pulse generators. This electromagnetic pickup comprises a magnetic body, a magnet, and an electrical coil. The magnetic flux varies with movement of the object to be detected to produce a voltage in the electrical coil by the electromagnetic induction. The voltage is used as a pulse signal.

However, the electromagnetic pickup is not suitable in the following field. That is, if the object to be detected moves at very low speeds, the produced voltage is as low as the noise level. If an amplifier is used, the noise is also amplified so that it is necessary to use a filter for removing the noise prior to the amplification. Conversely, the object moves at high speeds, the resulting voltage exceeds the breakdown voltage of the amplifier, thus requiring a limiter. In the case of low speeds, an auxiliary ring is attached to the object to be detected to increase the diameter and thus the peripheral speed. However, this method increases the number of parts and the size of the device. In addition, the timing of rise or fall of the voltage varies with the moving speed of the object to be detected, requiring a complicated signal processor to provide an accurate timing detection. Moreover, the waveform of the voltage varies with the shape of the object to be detected.

Another example is a Hall effect sensor used as a position sensor, angular sensor, or speed sensor. Japanese patent application Kokai No. 2-284082 discloses a Hall effect sensor. This Hall effect sensor comprises a Hall element and a magnet for changing the magnetic flux to the Hall element in response to movement of the object to be detected to provide an electrical signal from the Hall element. However, this type of sensor needs a power source to energize the Hall element. The output electrical signal is a sine wave and cannot produce a sharp pulse signal. If the object to be detected moves at low speeds, the rise of an output voltage is so low that the waveform is truncated. Like the above electromagnetic pickup, it is prone to an external magnetic field and noise and suffers from thermal drift, requiring a complicated processor to provide an accurate detection signal.

Japanese patent application Kokai No. 54-161257 discloses still another type of pulse signal generator. This pulse signal generator comprises a magnetism sensitive element made from a ferromagnetic material so as to have relatively soft and hard portions of magnetic anisotropy, a first magnetic field source for magnetizing the magnetism sensitive element in a positive direction, a second magnetic field source for magnetizing the soft portion of the magnetism sensitive element in a negative direction, a detection coil provided in vicinity of the magnetism sensitive element, and a movable body for interrupting the magnetization of the magnetism sensitive element by the first magnetic field source so that a pulse voltage is produced in the detection coil by the movement of the movable body.

This pulse signal generator is of the powerless type, provides a constant pulse voltage even if the movable object moves at very low speeds, and is resistant against an external magnetic field, thus solving some of the problems of the electromagnetic pickup and Hall effect sensor.

However, this pulse signal generator has the following problems and stands far from practical use. First of all, it needs a movable body with a slit. This movable body cannot be made smaller than the magnet, such as first and second magnetic field sources, and the magnetism sensitive element. Since the slits are provided in the movable body in radial directions, it is necessary to provide a movable body of a large diameter in order to increase the resolution. In addition, the movable body, the magnet, and the magnetism sensitive element should be parallel to each other. The magnet is prone to an external magnetic field or metal to become unstable in operation. It cannot replace the electromagnetic pickup or Hall effect sensor depending on the spacial relationship with the object to be detected. For example, it cannot be disposed to detect directly the teeth of a gear. Moreover, the bias magnetic field applied to the magnetism sensitive element by the second magnetic field source is so unstable that the resulting pulse wave is distorted or the generation timing is not constant, or the pulse wave is prone to noise.

SUMMARY OF THE INVENTION

Accordingly, it is an object of the invention to provide a pulse signal generator which solves such problems as described above and has a wider range of applications than before.

According to an aspect of the invention there is provided a pulse signal generator comprising: a magnetic element capable of causing a large Barkhausen jump; a detector provided relative to the magnetic element; a magnetic field generator provided in vicinity of the magnetic element for applying a biasing magnetic field to the magnetic element for making a predetermined magnetization; and a magnetic circuit forming unit provided in vicinity of the magnetic element for applying a main magnetic field to the magnetic element for causing a large Barkhausen jump in the magnetic element, characterized in that the magnetic field generator is provided with a magnetic field concentration member for concentrating the biasing magnetic field upon the magnetic element.

According to another aspect of the invention there is provided a pulse signal generator comprising: a magnetic element capable of causing a large Barkhausen jump; a detector provided relative to the magnetic element; a magnetic field generator provided in vicinity of the magnetic element for applying a biasing magnetic field to the magnetic element for making a predetermined magnetization and provided with a magnetic field concentration member for concentrating the biasing magnetic field; a magnetic circuit forming unit provided in vicinity of the magnetic element for applying a main magnetic field to the magnetic element for causing a large Barkhausen jump in the magnetic element, characterized in that the magnetic circuit forming unit is able to form a magnetic circuit via an object to be detected and change the main magnetic field in response to movement of the object to cause a large Barkhausen jump in the magnetic element.

According to still another aspect of the invention there is provided a pulse signal generator comprising: a magnetic element capable of causing a large Barkhausen jump; a detector provided relative to the magnetic element; a magnetic field generator provided in vicinity of the magnetic element for applying a biasing magnetic field to the magnetic element for making a predetermined magnetization and is provided with magnetic field concentration member for concentrating the biasing magnetic field upon the magnetic element; and a magnetic circuit forming unit provided in vicinity of the magnetic element for applying a main magnetic field to the magnetic element for causing a large Barkhausen jump in the magnetic element, characterized in that the magnetic circuit forming unit is kept stationary with respect to the magnetic element and provided with a magnetic path whose reluctance is changed by the object so as to change the main magnetic field, causing a large Barkhausen jump in the magnetic element.

According to yet another aspect of the invention there is provided a pulse signal generator comprising: a magnetic element capable of causing a large Barkhausen jump; a detector provided relative to the magnetic element; a magnetic field generator provided in vicinity of the magnetic element for applying a biasing magnetic field to the magnetic element for making a predetermined magnetization; and a magnetic circuit forming unit provided in vicinity of the magnetic element for applying a main magnetic field to the magnetic element for causing a large Barkhausen jump in the magnetic element, characterized in that the magnetic field generator is provided with magnetic field adjusting member for adjusting an intensity of the biasing magnetic field upon the magnetic element.

According to another aspect of the invention there is provided a pulse signal generator comprising: a magnetic element capable of causing a large Barkhausen jump; a detector provided relative to the magnetic element; a magnetic field generator provided in vicinity of the magnetic element for applying a biasing magnetic field to the magnetic element for making a predetermined magnetization; and a magnetic circuit forming unit provided in vicinity of the magnetic element for applying a main magnetic field to the magnetic element for causing a large Barkhausen jump in the magnetic element, characterized in that the magnetic field generator is provided with both magnetic field concentration member for concentrating the biasing magnetic field upon the magnetic element and magnetic field adjusting member for adjusting an intensity of the biasing magnetic field upon the magnetic element.

According to an embodiment of the invention there is provided a pulse signal generator wherein the magnetic field generator comprises a magnet and a magnetic member; and the magnetic concentration member comprises a pair of ends of the magnetic member provided close to ends of the magnetic element.

According to another embodiment of the invention there is provided a pulse signal generator wherein the magnetic field generator comprises a magnet; and the magnetic field concentration member a pair of magnetic poles of the magnet near ends of the magnetic element.

According to still another embodiment of the invention there is provided a pulse signal generator wherein the magnetic field generator comprises a magnet and a pair of magnetic members; and the magnetic field adjusting member comprises a magnetic block provided between the magnetic members.

According to yet another embodiment of the invention there is provided a pulse signal generator wherein the magnetic field generator comprises a magnet with a pair of leg sections constituting part of the magnetic field adjusting member; and the magnetic field adjusting member comprises a magnetic block provided between the leg sections.

According to another embodiment of the invention there is provided a pulse signal generator wherein the magnetic field generator comprises a magnet with a pair of first leg sections to constitute part of the magnetic field concentration member and a pair of second leg sections to constitute part of the magnetic field adjusting member; and the magnetic field adjusting member comprises a magnetic block provided between the second leg sections.

According to still another embodiment of the invention there is provided a pulse signal generator wherein the magnetic circuit forming unit comprises a magnet with a first end and a magnetic member with a second end provided so as to form a space between the first and second ends for accommodating an object to be detected.

According to yet another embodiment of the invention there is provided a pulse signal generator wherein the magnetic element is a wire-type element.

According to another embodiment of the invention there is provided a pulse signal generator wherein the detector comprises a detection coil provided around the magnetic element.

According to still another embodiment of the inventor there is provided a pulse signal generator wherein the magnetic element is a film-like element.

According to yet another embodiment of the invention there is provided a pulse signal generator wherein the magnetic element is a plate-like element.

According to another embodiment of the invention there is provided a pulse signal generator wherein the detector comprises a flat detection coil provided in vicinity of the magnetic element.

DESCRIPTION OF THE PREFERRED EMBODIMENTS

Figure 1:
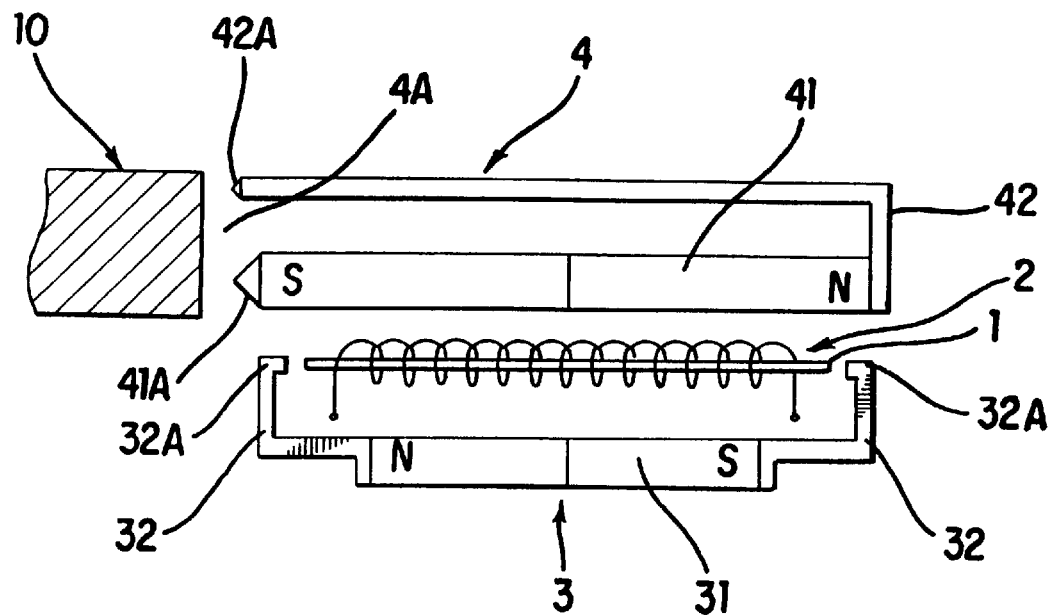
FIG. 1 is a schematic diagram showing a pulse signal generator according to an embodiment of the invention.

Before embodiments are described, the "magnetic element capable of causing a large Barkhausen jump" will be described. First of all, the structure and function of a wire-type composite magnetic element will be described. When a ferromagnetic body is drawn to form a wire, the wire has characteristic magnetic properties depending on the alloy composition. When the ferromagnetic wire is twisted, the peripheral and central regions have different magnetic properties because of different amounts of twist. Then, the wire is treated to provide a ferromagnetic wire which retains the magnetic properties. The magnetic direction of the peripheral region is changed by a weak magnetic field while the magnetic direction of the central region is changed by a magnetic field which is stronger than the magnetic field for the peripheral region. That is, the composite magnetic body has two kinds of magnetic regions; one which is magnetized easily and the other which is difficult to be magnetized. This composite magnetic wire is uniaxis anisotropic. The peripheral and central regions are called "soft" and "hard" layers, respectively, and the composite magnetic wire is called "wire-type composite magnetic element."

The magnetic directions of the hard and soft layers are not determined initially. When an external field which is sufficiently strong to invert the magnetic direction of the hard layer is applied to the composite magnetic wire in the axial direction, both the soft and hard layers are magnetized in the same magnetic direction. Then, an external magnetic field which is sufficiently strong to magnetize only the soft layer is applied in the direction opposite to the previous direction. Consequently, the soft and hard layers are magnetized in opposite directions. Since the element is uniaxial anisotropic, when the external field is removed, the magnetic direction of the soft layer remains stable under the influence of the hard layer. This external magnetic field is called "set magnetic field." Then, an external field which is opposite in direction is applied to increase the magnetic field. When the external magnetic field exceeds the critical strength, the magnetic direction of the soft layer is inverted abruptly. This magnetic field is called "critical magnetic field." The inversion phenomenon occurs instantly as the magnetic wall of the soft layer moves like avalanche. Consequently, the magnetic directions of the soft and hard layers are the same as the original state. This external magnetic field is stronger than the critical magnetic field and called "reset magnetic field." This avalanche phenomenon is called "large Barkhausen jump." The speed of the magnetic inversion depends on only the large Barkhausen jump and is irrelevant to the external magnetic field.

Beside the wire-type magnetic element, a variety of other magnetic elements which show the same properties may be used for the invention. A magnetic element which has no composite layers, such as hard and soft layers, may cause a large Barkhausen jump, too. For example, a thin film making technique such as disclosed in Japanese patent application Kokai No. 4-218905 is used to form a thin-film magnetic body. The magnetic elements may be of the thick films or plates. Thus, the "magnetic elements capable of causing large Barkhausen jump" include all the magnetic elements which show the above characteristics.

An embodiment of the invention will now be described. In FIG. 1, a pulse signal generator comprises a wire-type magnetic element 1, a detection coil 2 wound around the composite magnetic element 1, a magnetic field generator 3 disposed in the vicinity of the magnetic element 1 to produce a biasing magnetic field capable of magnetizing in a predetermined direction the soft layer of the magnetic element 1, and a magnetic circuit forming member 4 disposed in the vicinity of the magnetic element 1 in a stable relation to the magnetic element 1.

The magnetic field generator 3 comprises a bar-like permanent magnet (biasing magnet) 31 and a pair of magnetic members 32 extending from each end of the permanent magnet 31 to each end of the magnetic element 1. The end portion 32A of each magnetic member 32 which is closely spaced from the end of the magnetic element 1 concentrates the biasing magnetic field of the permanent magnet 31 onto the magnetic element 1. The magnetic circuit forming member 4 consists of a bar-like permanent magnet (main magnet) 41 which has poles opposite to those of the permanent magnet 3 and a magnetic member 42 made from a magnetic material which is attached to an end of the permanent magnet 41 and bent into parallel to the permanent magnet 41. The other end 41A of the permanent magnet 41 and a free end of the magnetic member 42 produce a magnetic path 4A between them, the magnetic resistance (reluctance) of which is changed by the body to be detected 10.

The operation of the pulse signal generator will be described. The body to be detected 10 is a tooth of a gear, for example. When the gear tooth 10 is in the vicinity of the magnetic path 4A between the end 41A of the permanent magnet 41 and the end 42A of the magnetic member 42, the magnetic field of the permanent magnet 31 is dominant with respect to the magnetic element 1 and magnetizes only the soft layer of the magnetic element 1 in the direction opposite to the hard layer. When the gear tooth 10 is not in the vicinity of the magnetic path 4A, the magnetic field of the permanent magnet 41 is dominant with respect to the magnetic element 1 so that the magnetic field applied to the magnetic element 1 is inverted so as to align the magnetic directions of the hard and soft layers of the magnetic element 1.

Figure 2:
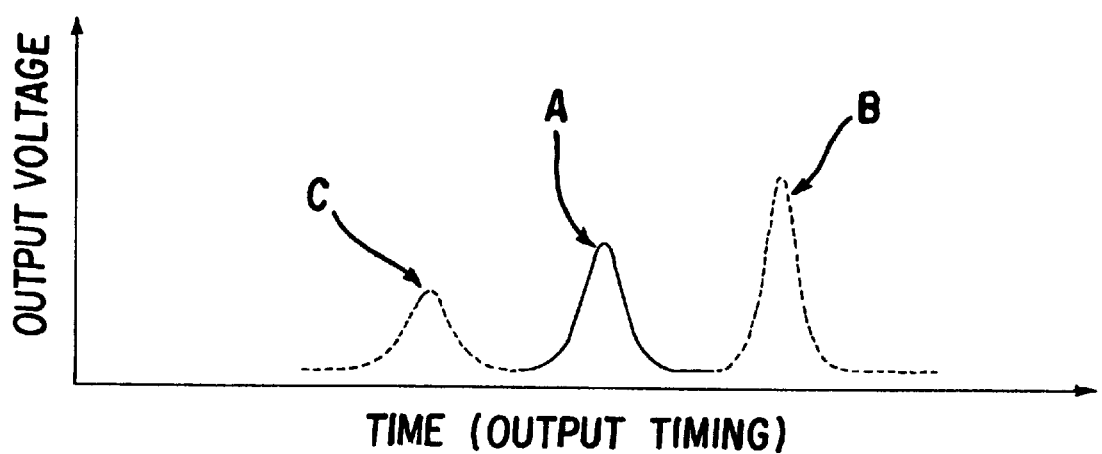
FIG. 2 is a graph showing the waveform of a pulse voltage generated by the pulse signal generator of FIG. 1.

In this way, the magnetic flux from the permanent magnet 41 concentrates on the detection area or the magnetic path 4A. Consequently, when the gear tooth 10 comes in the detection area 4A, the magnetic field (main field) of the permanent magnet 41 upon the magnetic element 1 is changed. That is, the gear tooth 10 reduces the magnetic resistance (reluctance) of the magnetic path 4A so that the magnetic flux from the permanent magnet 41 concentrates on the magnetic path 4A. Consequently, the external field of the permanent magnet 41 upon the magnetic element 1 is weaker than before. As a result, the magnetic field of the permanent magnet 31 is dominant so that the soft layer of the magnetic element 1 is magnetized in the direction opposite to that of the hard layer, establishing the set state. When the gear tooth 10 moves away from the detection area 4A, the magnetic resistance (reluctance) of the magnetic path 4A becomes high, so that the magnetic flux from the permanent magnet 41 does not concentrate on the magnetic path 4A. Consequently, the external field of the permanent magnet 41 upon the magnetic element 1 becomes high, thus the magnetic field is inverted. For this reason, the magnetic field in the same direction as that of the hard layer is applied. When it exceeds the critical strength, the large Barkhausen jump takes place. Since the magnetic field of the soft layer changes at a very high speed, a pulse voltage is generated in the detection coil 2 by the electromagnetic induction. The waveform of the pulse voltage is shown by A in FIG. 2. The magnetic circuit forming member 4 converts the change of the gear rotation speed to the change of magnetic state of the magnetic element 1 by the permanent magnet 41.

Since the biasing magnetic field of the permanent magnet 31 is applied to the magnetic element 1 via the end portion 32A of the magnetic member 32, the biasing magnetic field applied to the magnetic element 1 is stabilized. If the biasing magnetic field is not stable, the following problems arise. For example, when the biasing magnetic field is too strong, the generation of a pulse voltage is delayed as shown by B in FIG. 2. Conversely, if the biasing magnetic field is too weak, the generation of a pulse voltage is advanced as shown by C in FIG. 2. In addition, if the biasing magnetic field applied to the magnetic element 1 is unstable, the waveform of the resulting pulse can be distorted.

By concentrating the biasing magnetic field onto the magnetic element 1, it is possible to resist against external influences, stabilize the magnetic field produced by the magnetic circuit consisting of the main magnet 41, the biasing magnet 31, and the detection object 10, and thus resist against noise. For example, when the detection object 10 is moved away from the magnetic path 4A toward the end of the biasing magnet 31, the end portion 32A of the magnetic member 32 prevents change, by the detection object 10, of the biasing magnetic field which is applied upon the magnetic element 1.

Figure 3:
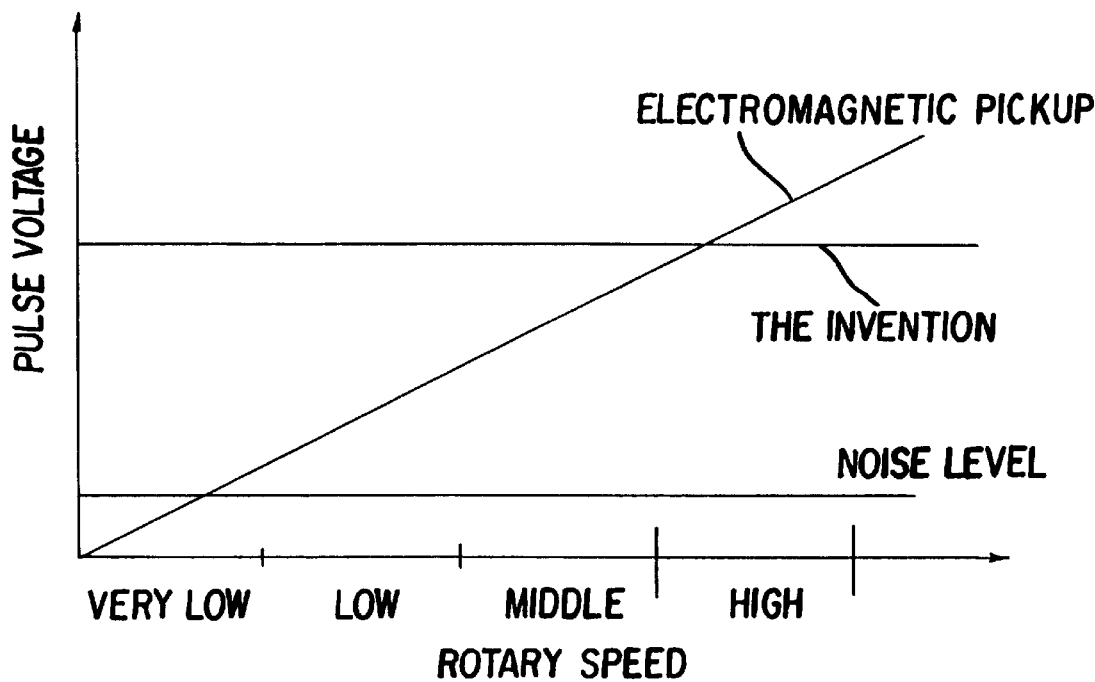
FIG. 3 is a graph showing a comparison in pulse voltage between the pulse signal generator according to the invention and a conventional electromagnetic pickup.

The change of magnetic state by the large Barkhausen jump in the magnetic element 1 is detected by the detection coil 2 as a pulse voltage by the electromagnetic induction. The presence or absence of the gear tooth causes the large Barkhausen jump in the magnetic element 1 and generates a pulse signal. Thus, even if the object to be detected moves slowly, it is possible to make detection. The pulse voltage keeps a constant voltage and phase relationship. A comparison between the pulse voltage according to the invention and the pulse voltage by the conventional electromagnetic pickup is shown in FIG. 3. The amplitude of the pulse voltage by the conventional electromagnetic pickup varies with the speed of the object to be detected. When the detection object moves at very low speeds, the pulse voltage can be below the noise level, whereas the amplitude of the pulse voltage by the invention keeps a predetermined level regardless of the speed of the object to be detected.

According to the invention, by adjusting the size of the detection area 4A of the magnetic circuit forming member 4 it is possible to provide very high resolution. For example, by matching the distance between the ends 41A ad 42A of the permanent magnet 41 and the magnetic member 42 with the size or pitch of the gear tooth 10, it is possible to increase the resolution.

If the detection object is made from a magnetic material, such as a permanent magnet or those able to be magnetized, it is not necessary to provide a separate movable body.

Figure 4:
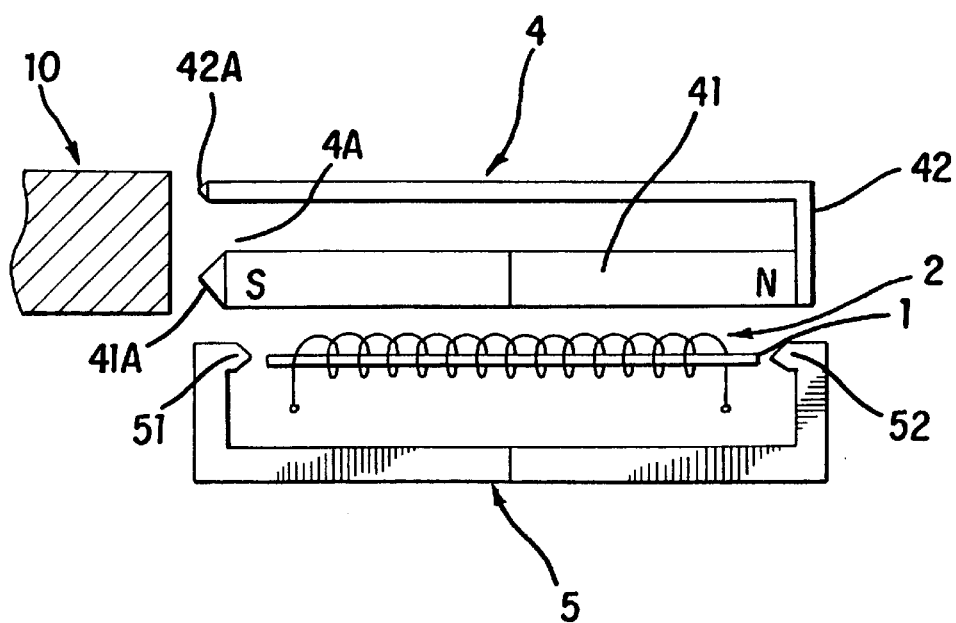
FIG. 4 is a schematic diagram of a pulse signal generator according to another embodiment of the invention.

FIG. 4 shows another embodiment of the invention. A pulse signal generator is identical with that of FIG. 1 except for the magnetic circuit forming member. A magnetic circuit forming member 5 consists of a C-shaped permanent magnet. The permanent magnet 5 comprises a pair of leg sections having an N-pole end portion 51 and an S-pole end portion 52. These end portions 51 and 52 are provided close to the ends of the magnetic element 1 and concentrate the biasing magnetic field onto the magnetic element 1. The operation of this embodiment is substantially identical with that of the embodiment in FIG. 1, and its description is omitted.

Figure 5:
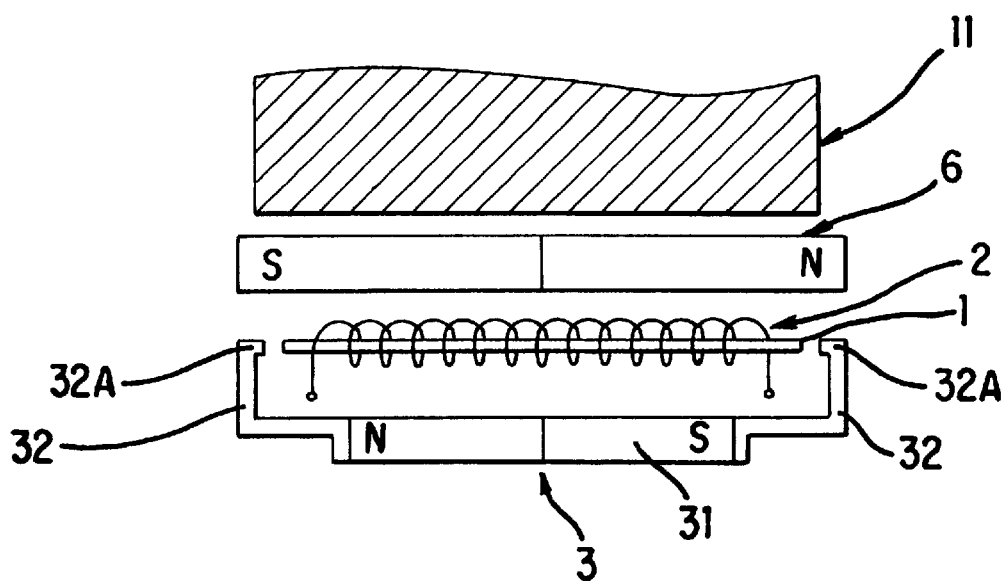
FIG. 5 is a schematic diagram of a pulse signal generator according to still another embodiment of the invention.

FIG. 5 shows the third embodiment of the invention. This pulse signal generator is identical with that of FIG. 1 except for the magnetic circuit forming member, and only the structure of a magnetic circuit forming member 6 is described. The magnetic circuit forming member 6 consists of a bar-like permanent magnet (main magnet) 6. As shown in FIG. 5, it is preferred that the detection area of a detection object 11 is between the N and S poles of the permanent magnet 6, or along one side of the permanent magnet 6. The operation of the pulse signal generator is substantially identical with that of FIG. 1, and its description is omitted. The bar-like permanent magnet 6 may be movable in response to movement of the detection object 11.

Figure 6:
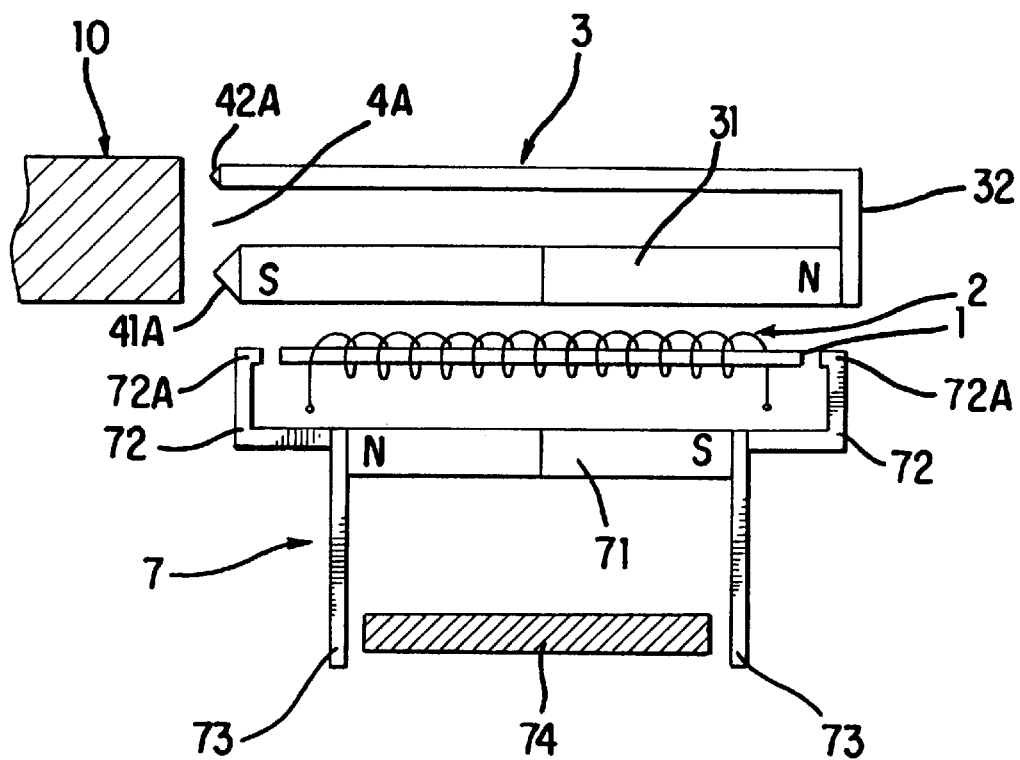
FIG. 6 is a schematic diagram of a pulse signal generator according to yet another embodiment of the invention.

FIG. 6 shows the fourth embodiment of the invention. This pulse signal generator is identical with that of FIG. 1 except for the magnetic field generator, and only the structure of a magnetic field generator 7 is described. This magnetic field generator 7 comprises a bar-like permanent magnet (bias magnet) 71, a pair of first magnetic members 72 extending from the ends of the permanent magnet 71 toward the ends of the magnetic element 1, a pair of second magnetic members 73 extending outwardly from the ends of the permanent magnet 71, and a magnetic block 74 provided between these second magnetic members 73. The end portions 72A of the first magnetic member 72 concentrate the biasing magnetic field of the permanent magnet 71 onto the magnetic element 1. The second magnetic members 73 and the magnetic block 74 form a magnetic adjusting unit to adjust the intensity of the biasing magnetic field applied to the magnetic element 1. The magnetic block 74 may be made of iron or nickel and has an appropriate volume.

This pulse signal generator is able to adjust the intensity of the biasing magnetic field applied to the magnetic element 1 by selecting the volume, shape, and magnetic characteristics of the magnetic block 74. Consequently, by selecting the appropriate magnetic block 74 during manufacturing, it is possible to provide a pulse signal generator of the desired tolerance. The first and/or second magnetic members 72 and/or 73 may be replaced by a pair of leg sections formed integrally with the permanent magnet 71 to provide a magnetic field concentration unit and/or a magnetic field adjusting unit. It is easy to make such a permanent magnet with the use of a plastic magnet, etc.

In the above examples, the wire-type magnetic element 1 is used but, as described above, a variety of other magnetic elements, such as thin-film, thick-film, or magnetic plate, may be used. In these cases, the detection coil 2 may be made as a flat coil. The magnetic element may be a single layer magnetic element.

Alternatively, the biasing magnet and the main magnet may be electromagnets or the like. The detection coil may be replaced by a Hall element, MR element, or resonator circuit.

Since the biasing magnetic field upon the magnetic element is kept at a predetermined value, the timing of pulse generation is kept constant. The pulse has an undistorted waveform and is resistant against external noise.

Since it is easy to adjust the intensity of a biasing magnetic field and thus compensate for the manufacturing tolerance, it is easy to provide the device with predetermined characteristics.

Since the magnetic field of a magnet is concentrated to provide a biasing magnetic field, it is possible to make the magnet compact and weak, making the device compact and inexpensive.

As described above, the device can find more applications than the conventional electromagnetic pickup and Hall effect sensor. For example, it can be used for the detection of r.p.m. and angle of an automobile engine, automobile ABS, motor, crank shaft, acceleration sensor, such as an air bag sensor, PC keyboard, plugging detection of HID lamps, vibration sensor, swing sensor, and door open/close sensor.

What is claimed is:

1. A pulse signal generator comprising:

a magnetic element capable of causing a large Barkhausen jump;

a detector provided relative to said magnetic element;

a magnetic field generator provided in vicinity of said magnetic element and having a first bar-like permanent magnet for applying a biasing magnetic field to said magnetic element for making a predetermined magnetization; and a magnetic circuit forming unit provided in vicinity of said magnetic element for applying a main magnetic field to said magnetic element for causing a large Barkhausen jump in said magnetic element, characterized in that said magnetic field generator is provided with magnetic field concentration means for concentrating said biasing magnetic field upon said magnetic element, and said magnetic circuit forming unit comprises a second bar-like permanent magnet having a pair of poles opposite to those of said first permanent magnet of said magnetic field generator, and a magnetic member made from a magnetic material, attached to an end of said second permanent magnet and bent into parallel to said second permanent magnet and toward a free end of said second permanent magnet, thus concentrating magnetic flux from said second permanent magnet in a magnetic path between a free end of said magnetic member and said free end of said second permanent magnet.

2. A pulse signal generator according to claim 1, wherein said magnetic circuit forming unit is able to form a magnetic circuit via an object to be detected and change said main magnetic field in response to movement of said object to cause a large Barkhausen jump in said magnetic element.

3. A pulse signal generator according to claim 1, wherein said magnetic circuit forming unit is kept stationary with respect to said magnetic element and provided with a magnetic path whose reluctance is changed by an object to be detected so as to change said main magnetic field, causing a large Barkhausen jump in said magnetic element.

4. A pulse signal generator according to claim 1, wherein said magnetic field generator is provided with magnetic field adjusting means for adjusting an intensity of said biasing magnetic field upon said magnetic element.

5. A pulse signal generator according to claim 1, wherein said magnetic field generator is provided with both magnetic field concentration means for concentrating said biasing magnetic field upon said magnetic element and magnetic field adjusting means for adjusting an intensity of said biasing magnetic field upon said magnetic element.

6. A pulse signal generator according to claim 1, 2, 3, or 5, wherein said magnetic field generator comprises a magnet and a magnetic member; and said magnetic concentration means comprises a pair of ends of said magnetic member provided close to ends of said magnetic element.

7. A pulse signal generator according to claim 1, 2, 3, or 5, wherein said magnetic field generator comprises a magnet; and said magnetic field concentration means a pair of magnetic poles of said magnet near ends of said magnetic element.

8. A pulse signal generator according to claim 4 or 5 wherein said magnetic field generator comprises a magnet and a pair of magnetic members; and said magnetic field adjusting means comprises a magnetic block provided between said magnetic members.

9. A pulse signal generator according to claim 4 or 5, wherein said magnetic field generator comprises a magnet with a pair of leg sections constituting part of said magnetic field adjusting means; and said magnetic field adjusting means comprises a magnetic block provided between said leg sections.

10. A pulse signal generator comprising:

a magnetic element capable of causing a large Barkhausen jump;

a detector provided relative to said magnetic element;

a magnetic field generator provided in vicinity of said magnetic element and having a first bar-like permanent magnet for applying a biasing magnetic field to said magnetic element for making a predetermined magnetization; and a magnetic circuit forming unit provided in vicinity of said magnetic element for applying a main magnetic field to said magnetic element for causing a large Barkhausen jump in said magnetic element, characterized in that said magnetic field generator is provided with magnetic field concentration means for concentrating said biasing magnetic field upon said magnetic element, and said magnetic circuit forming unit comprises a second bar-like permanent magnet having a pair of poles opposite to those of said first permanent magnet of said magnetic field generator, and a magnetic member made from a magnetic material, attached to an end of said second permanent magnet and bent into parallel to said second permanent magnet and toward a free end of said second permanent magnet, thus concentrating magnetic flux from said second permanent magnet in a magnetic path between a free end of said magnetic member and said free end of said second permanent magnet, wherein said magnetic field generator is provided with both magnetic field concentration means for concentrating said biasing magnetic field upon said magnetic element and magnetic field adjusting means for adjusting an intensity of said biasing magnetic field upon said magnetic element, and comprises a magnet with a pair of first leg sections to constitute part of said magnetic field concentration means and a pair of second leg sections to constitute part of said magnetic field adjusting means; and said magnetic field adjusting means comprises a magnetic block provided between said leg sections.

11. A pulse signal generator according to one of claims 1–5 and 10, wherein said magnetic element is a wire-type element.

12. A pulse signal generator according to one of claims 1–5 and 10, wherein said detector comprises a detection coil provided around said magnetic element.

13. A pulse signal generator according to claim 1, wherein said magnetic path accommodates an object to be detected.

* * * * *